United States Patent [19]
Joosten

[11] 3,710,965
[45] Jan. 16, 1973

[54] MATERIAL HANDLING VEHICLE AND METHOD OF STORING SAME

[76] Inventor: James K. Joosten, 8601 West 85th Avenue, Schererville, Ind. 46375

[22] Filed: Dec. 21, 1970

[21] Appl. No.: 99,920

[52] U.S. Cl. ......................214/515, 187/9, 214/2, 180/25 A, 180/11
[51] Int. Cl. ..............................................B60p 1/64
[58] Field of Search .........105/29; 214/670, 674, 515

[56] References Cited

UNITED STATES PATENTS 2,700,345   1/1955   Cox ..................................105/29 R

FOREIGN PATENTS OR APPLICATIONS 188,040   3/1964   Sweden ..................................214/670
565,537   3/1958   Belgium ..................................214/674

*Primary Examiner*—Gerald M. Forlenza
*Assistant Examiner*—Frank E. Werner

[57] ABSTRACT

A self-storing material handling and transporting vehicle of the type having a power source which acts as a counterweight. The combination counterweight and power source is movable on the frame of the vehicle so as to facilitate proper balance, traction, conveyance and storage of the vehicle. In a preferred embodiment the frame of the vehicle is divided into two portions whereby one portion may be pivoted about the other so as to place the vehicle in the most compact position for transport from place to place and/or storage.

3 Claims, 9 Drawing Figures

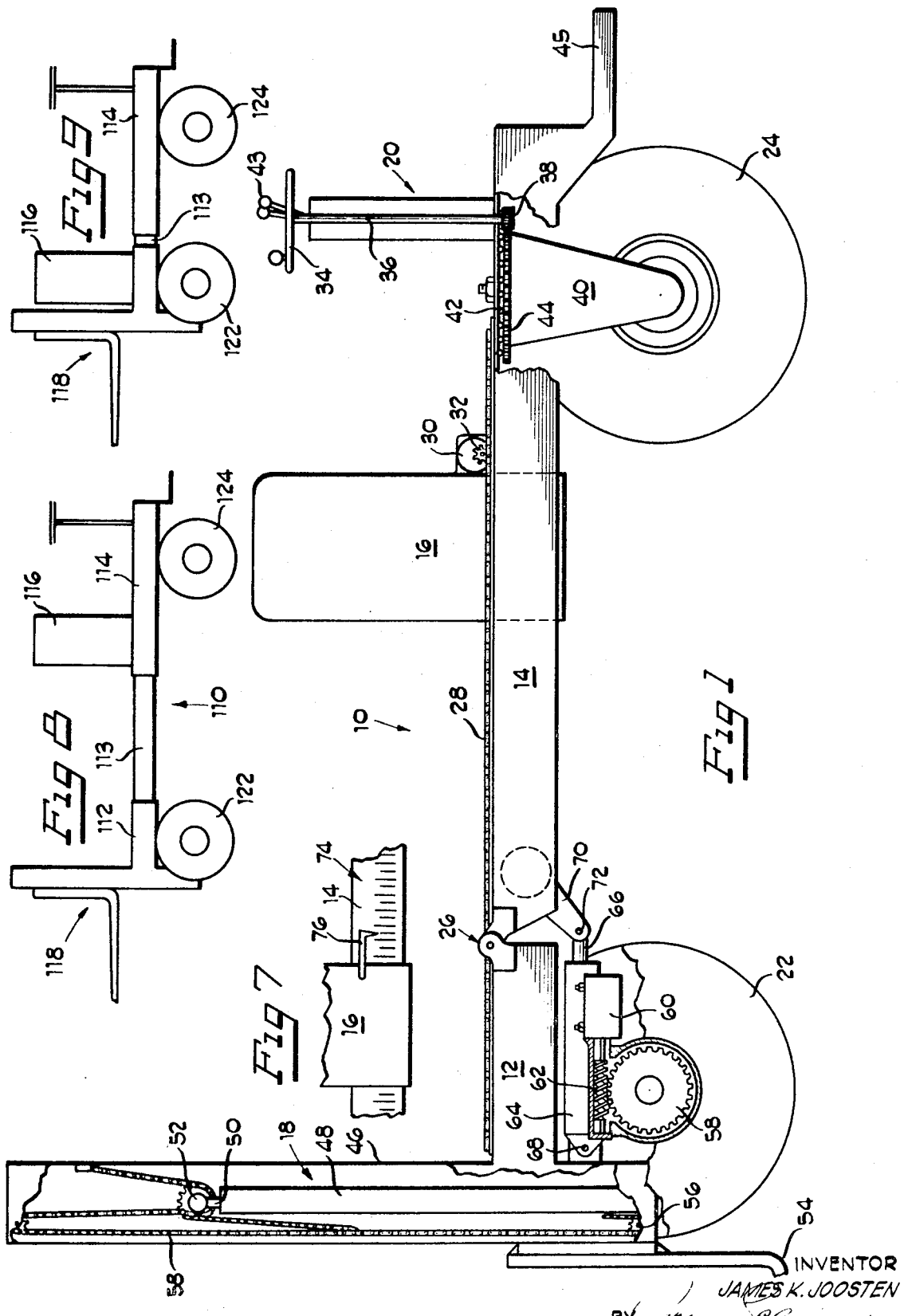

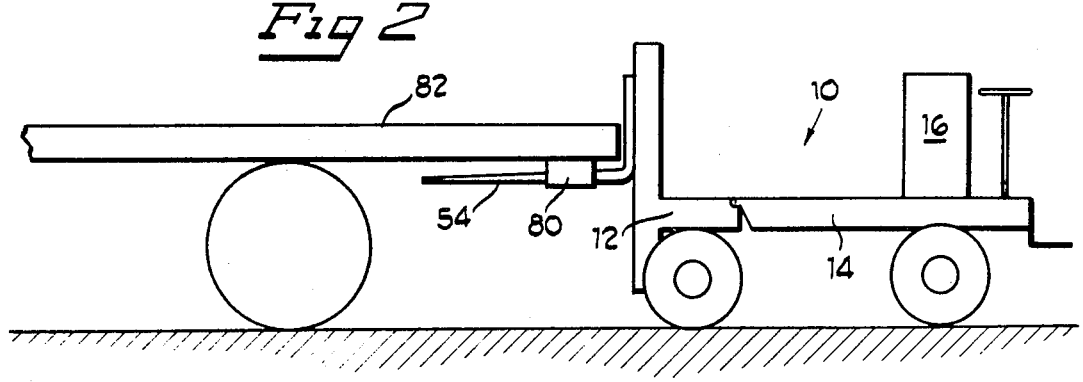
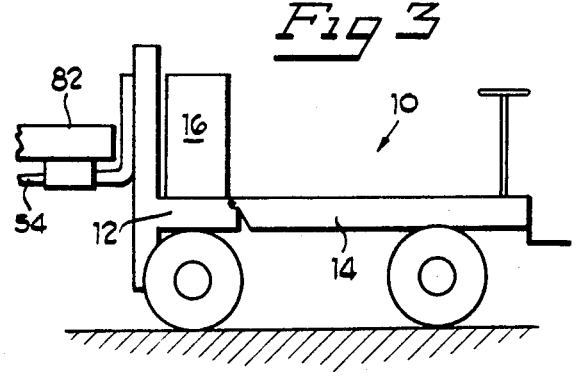
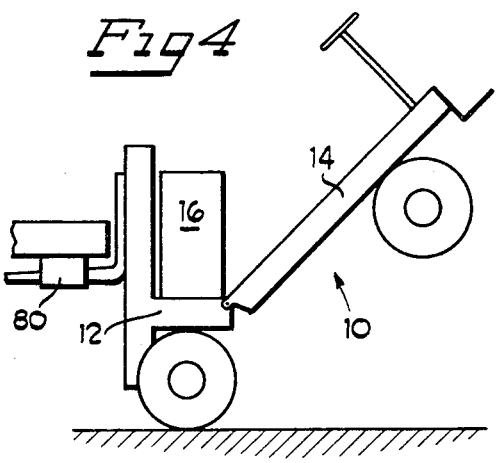
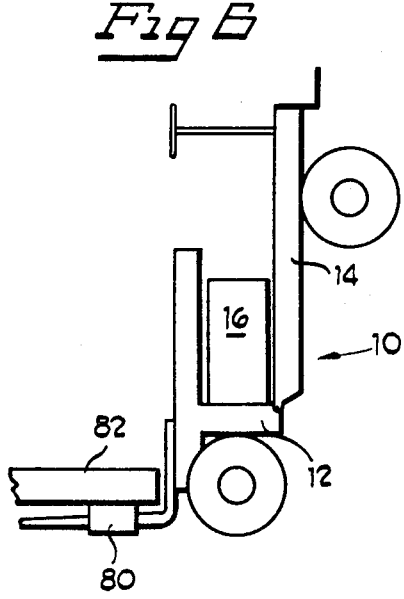
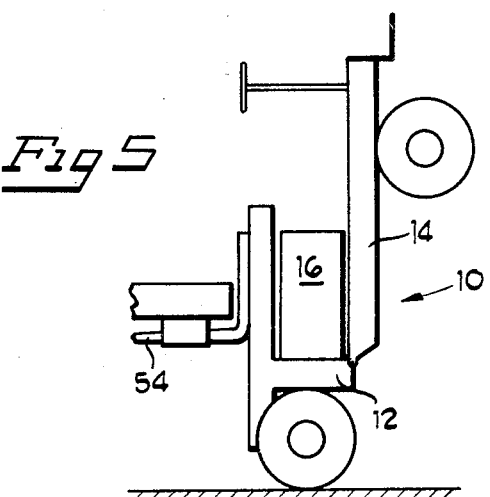

MATERIAL HANDLING VEHICLE AND METHOD OF STORING SAME

BACKGROUND OF INVENTION

Material handling vehicles frequently are moved distances of such length necessitating transporting of the vehicle on a conventional truck. Except in locations where special loading docks or other apparatus are available, placement of the vehicle on the conventional truck is somewhat complex requiring special planks or ramps to be carried on the truck to enable the material handling vehicle to be driven onto the truck.

SUMMARY OF INVENTION

The present invention is a material handling vehicle or lift truck having a two-part frame and a movable combined counterweight and power source whereby the forks of the lift on the vehicle may be engaged in receptacles on the truck. The raising and lowering cylinder of the vehicle may be actuated to raise the material handling vehicle or lift truck off the ground and the rear portion of the vehicle pivoted to a vertical position either upwardly or downwardly. In this manner the lift truck is self-stored for transport in a compact position either on a truck or for easy towing by a truck.

The novel method of the present invention for self-storing the lift truck comprises the steps of (1) engaging the lifting forks of the lift truck in a receptacle on a truck, (2) moving the combined counterweight and power source on the vehicle to its forward position, (3) pivoting the rear portion of the vehicle to a vertical position and (4) activating the lift forks of the lift truck whereby the lift truck is placed in a stored position on the truck for transport.

DESCRIPTION OF THE DRAWINGS

Other advantages of the invention will be apparent from the following description illustrated by the accompanying drawings wherein:

FIG. 1 is a view of a lift truck embodying the principles of the present invention;

FIGS. 2-6 are views of the lift truck in its various positions while attaining its stored position on a transport vehicle, FIG. 7 is a fragmentary view illustrating the load weighing mechanism of the present invention, FIG. 8 is a schematic view of a modified form of the present invention, and FIG. 9 is a schematic view of the invention of FIG. 8 showing the vehicle in collapsed configuration.

Referring to FIG. 1, a novel material handling vehicle or lift truck 10 is illustrated. Generally, the lift truck includes a front frame portion 12, a rear frame portion 14, a combined counterweight and power source 16, a lift mechanism 18, a steering mechanism 20, front ground engaging wheels 22, and rear steerable ground engaging wheel 24. Although the truck is illustrated with one steerable wheel, it is understood that two or more wheels may be used.

Front frame portion 12 and rear frame portion 14 are connected by a pivot 26, the function of which will be later described. Provided on both frame portions 12 and 14 is a common fixed roller chain 28. The combined counterweight and power source 16 is slidable on both frame portions. Provided in conjunction with the power source 16, which may comprise batteries or an internal combustion engine driving a pump, is a hydraulic or electric motor 30. The motor 30 drives a sprocket 32, the sprocket 32 being in engagement with the chain 28 whereby motor 30 may move power source 16 longitudinally along the frame portions 12 and 14.

Steering mechanism 20 includes a steering wheel 34 connected to turn a steering shaft 36. On the lower end of shaft 36 is a pinion gear 38. Steering wheel 24 is mounted on a support 40 which in turn is mounted on rear frame portion 14 by means of a thrust bearing 42. Wheel support 40 carries a ring gear 44 in engagement with the pinion gear 38 whereby steering wheel 34 may turn wheel 24 about the axis of thrust bearing 42. Also provided on steering mechanism 20 are manual controls 43 for remote control of the power source 16 and the wheel drive for the lift truck. Rear frame portion 14 further includes a platform 45 upon which the operator of the vehicle may stand.

Lift mechanism 18 includes vertical frame members 46 in which is mounted a hydraulic lift cylinder or power means 48. Piston rod 50 of lift cylinder 48 carries a sprocket 52. Slidably mounted on frame members 46 are lift forks or load means 54. Carried by forks 54 is a sprocket 56. A chain 28 is mounted on frame members 46 and is engaged by sprockets 52 and 56 whereby forks 54 may be raised and lowered.

Drivingly connected to front wheels 22 is drive gear 58. Supported on each frame portion 12 are motors 60 which may be electric or hydraulic depending on the type of power source used. Motors 60 drive worm gears 62 which are in engagement with drive gears 58 whereby driving wheels 22 may be driven.

Mounted in the center of frame members 12 is a hydraulic cylinder 64 having a piston rod 66. Cylinder 63 is pivotally mounted on frame portion 12 at 68. A link 70 is fixedly mounted on rear frame portions 14. Link 70 is pivotally connected to piston rod 66 at 72 whereby cylinder 64 may be actuated to pivot rear frame portion 14 about front frame portion 12. Though the pivoting is shown to be upwardly, this is for purposes of illustration, and pivoting may be downwardly as well.

In FIG. 7 an optional load weighing structure is illustrated. A scale 74 is provided on an external portion of frame portion 14. A pointer 76 is mounted on power source 16 in association with the scale 74. Since the power source and counterweight 16 is movable on frame portion 14, the power source may be moved to a position at which the load carried by forks 54 just begins to pivot the vehicle about front wheels 22. This is generally in a forward direction, i.e., toward the lift forks 54. Since the weight of power source 16 is known the scale 74 can be calibrated such that at the point the load begins to lift the wheel 24 off the ground, pointer 76 will give a direct reading of the weight of the load on forks 54.

In FIGS. 2-6 the self-storing characteristics of the vehicle 10 are illustrated. The method of storing the vehicle 10 is as follows: (1) lift truck forks 54 are engaged in receptacles 80 on a transport truck 82 or vehicle as shown in FIG. 2, (2) the combined counterweight and power source 16 is moved to its forward position on frame portion 12 as shown in FIG. 3, (3)

hydraulic cylinder 64 is actuated to pivot rear frame portion 14 about front frame portion 12 as illustrated in FIG. 4 to the vertical position of FIG. 5, and (4) the lift cylinder 48 is actuated whereby the entire lift truck is raised off the ground as illustrated in FIG. 6. The pivot is shown upwardly; however, with minor modification the pivot may be downwardly.

When the novel method outlined above is practiced, it will be seen that the lift truck 10 has been conveniently stored on a truck for transportation by means of its own power and without any external apparatus except for receptacles 80 provided on the truck. After the lift truck 10 has been transported to a new site it may be returned to its operating position on the ground by reversing the above-outlined steps. The truck 10 may also be collapsed as in the steps outlined whereby the center of gravity is adjacent the lift mechanism and this will allow it to be towed extremely easily by a second vehicle.

The lift truck 10 has the further advantage that since the counterweight 16 is movable on the frame the counterweight 16 can always be moved as far forward as possible (without the load raising the rear wheel) whereby maximum weight is placed on the front driving wheels to provide increased traction.

Referring to FIGS. 8 and 9 a modified form of self-storing vehicle 110 is illustrated. Vehicle 110 has a frame comprised of three telescoping sections 112, 113 and 114. When the vehicle 110 is to be stored the weight 116 will be moved to the end adjacent lift mechanism 118 and then a hydraulic cylinder or other power means (not illustrated) may be activated to telescope the frame sections into one another to the compacted or storing configuration of FIG. 9. It will be apparent that two telescoping frame sections or alternatively more than three telescoping frame sections may be used depending on the size of the vehicle desired in both operating and telescoped configurations.

To summarize, the above-described improved lift truck provides structure such that load may be automatically weighed, maximum traction can be obtained by easy optional location of the counterweight, and practice of the above-cited self-storing method is enabled.

Various features of the invention have been particularly shown and described. However, it should be obvious to one skilled in the art that modifications may be made therein without departing from the scope of the invention.

I claim:

1. A material handling vehicle including load means on said vehicle for engaging and moving loads, power means on said vehicle for raising and lowering said load means, said vehicle having a frame comprising pivotally portions, a power source for driving said vehicle and operating said power means and slidable on both of said frame portions, actuating means for pivoting one of said frame sections about the other whereby after the power source is moved from a use position on one section to a non-use position on the other section said load means are brought into engagement with a receiving means on a separate vehicle, said material handling vehicle may be self-stored by lowering said load means to lift said vehicle and said actuating means activated to pivot said sections to place said one section of said vehicle in a generally vertical position for compact storage for transport of said vehicle.

2. A material handling vehicle as claimed in claim 1, wherein said power source is a counterweight.

3. A material handling vehicle as claimed in claim 2, wherein said counterweight includes means to move said counterweight along said frame.

* * * * *